Figure 1:
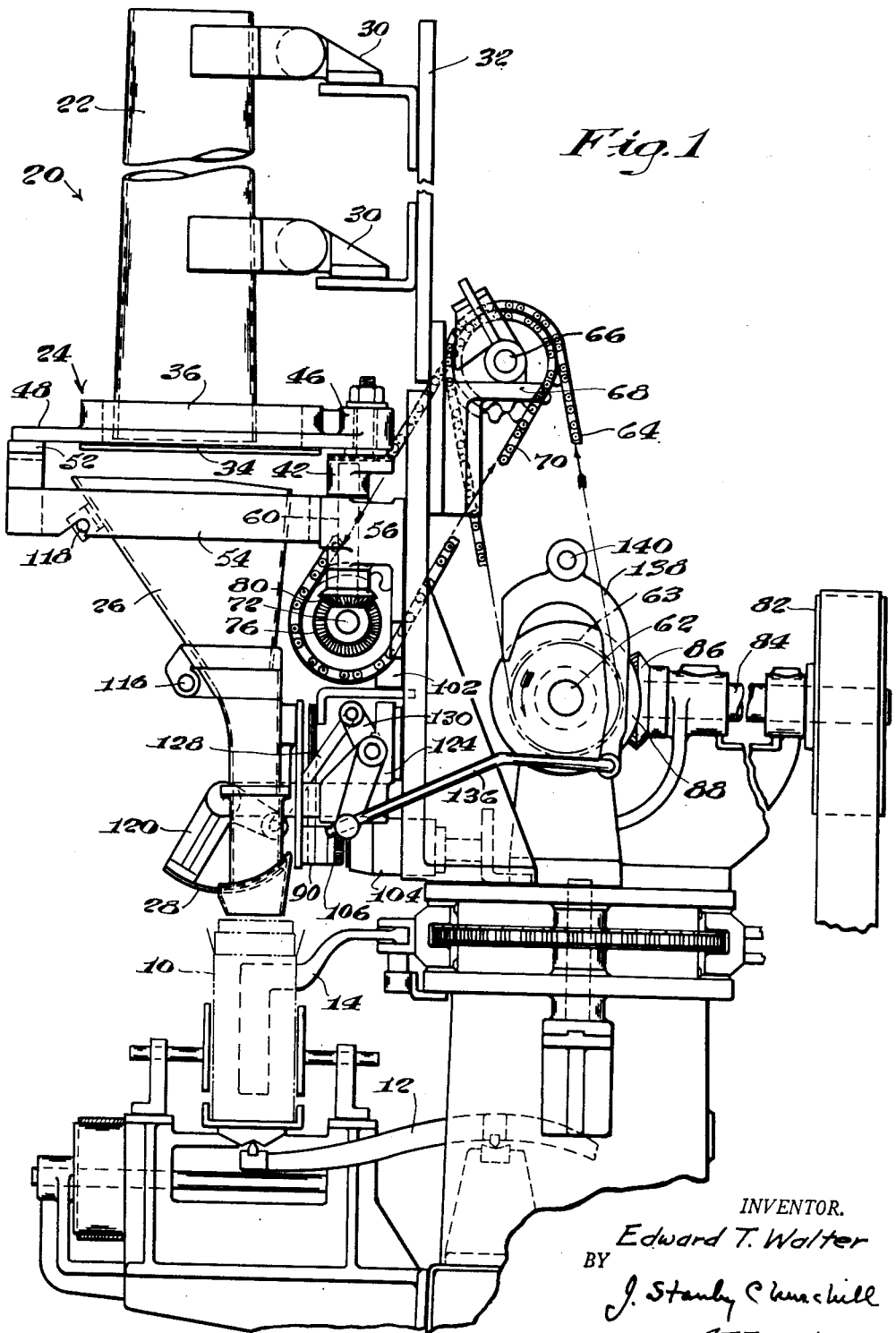

Jan. 5, 1954 — E. T. WALTER — 2,665,006
MATERIAL FEEDING MACHINE
Filed March 30, 1948 — 5 Sheets-Sheet 1

INVENTOR.
Edward T. Walter
BY
J. Stanley Churchill
ATTORNEY

Jan. 5, 1954  E. T. WALTER  2,665,006
MATERIAL FEEDING MACHINE
Filed March 30, 1948  5 Sheets-Sheet 2
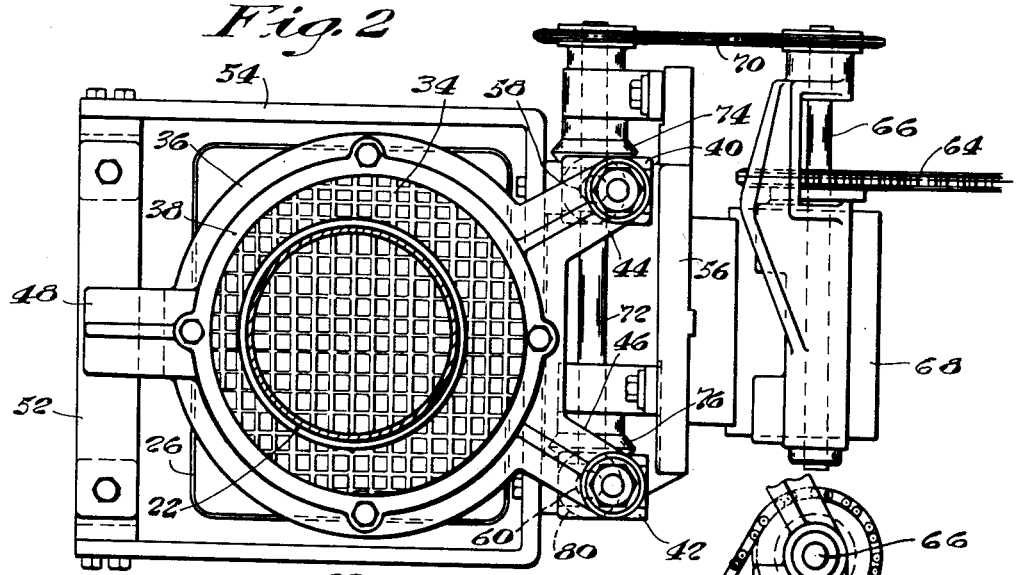
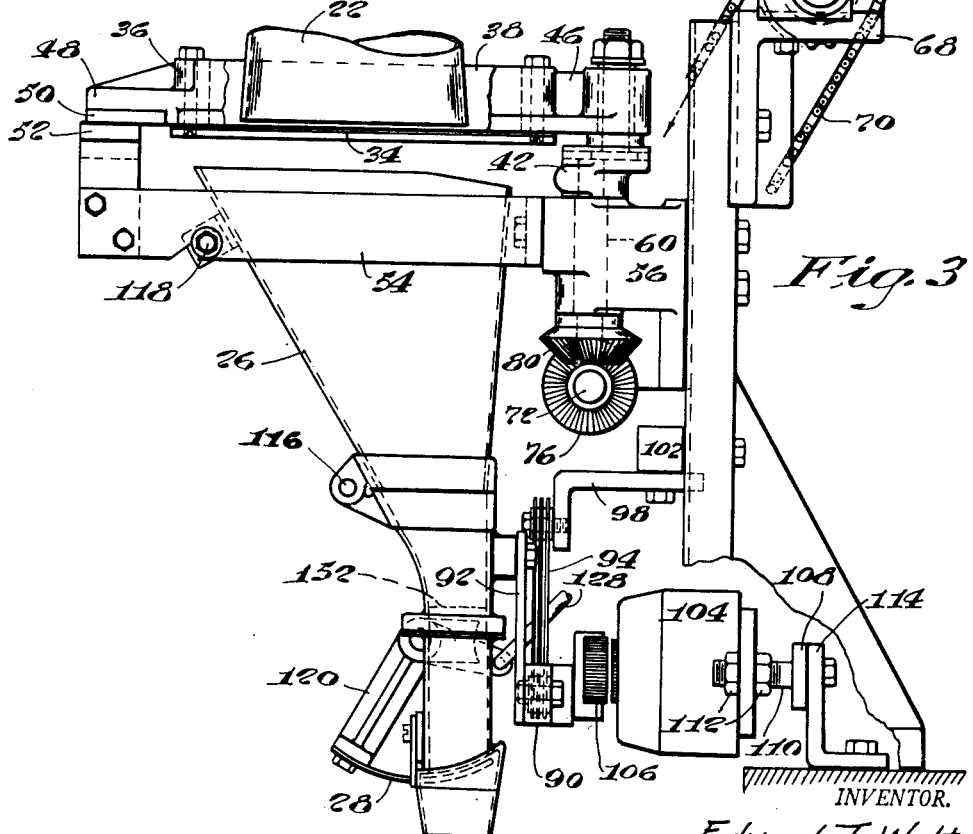
INVENTOR.
Edward T. Walter
BY J. Stanley Churchill
ATTORNEY

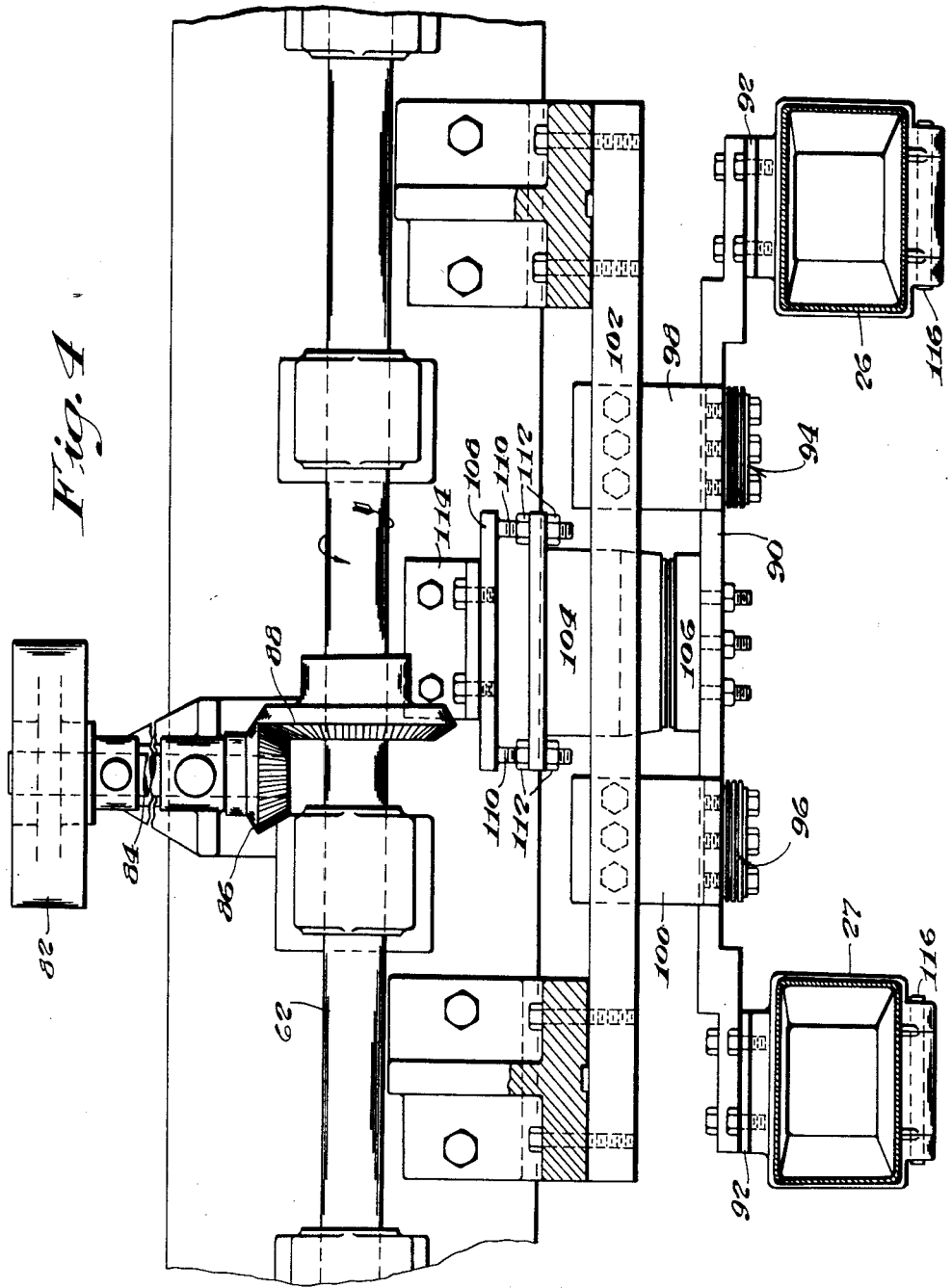

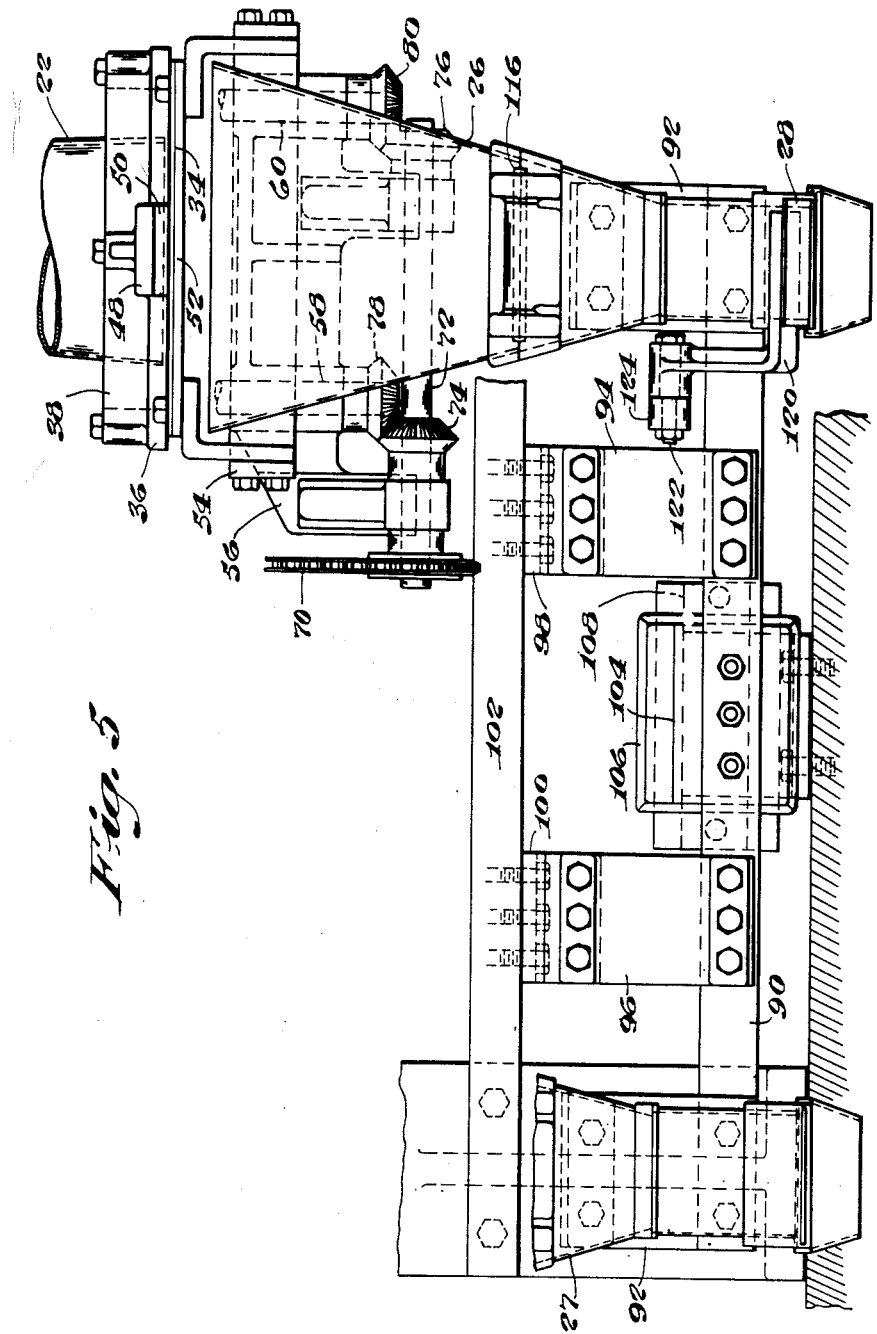

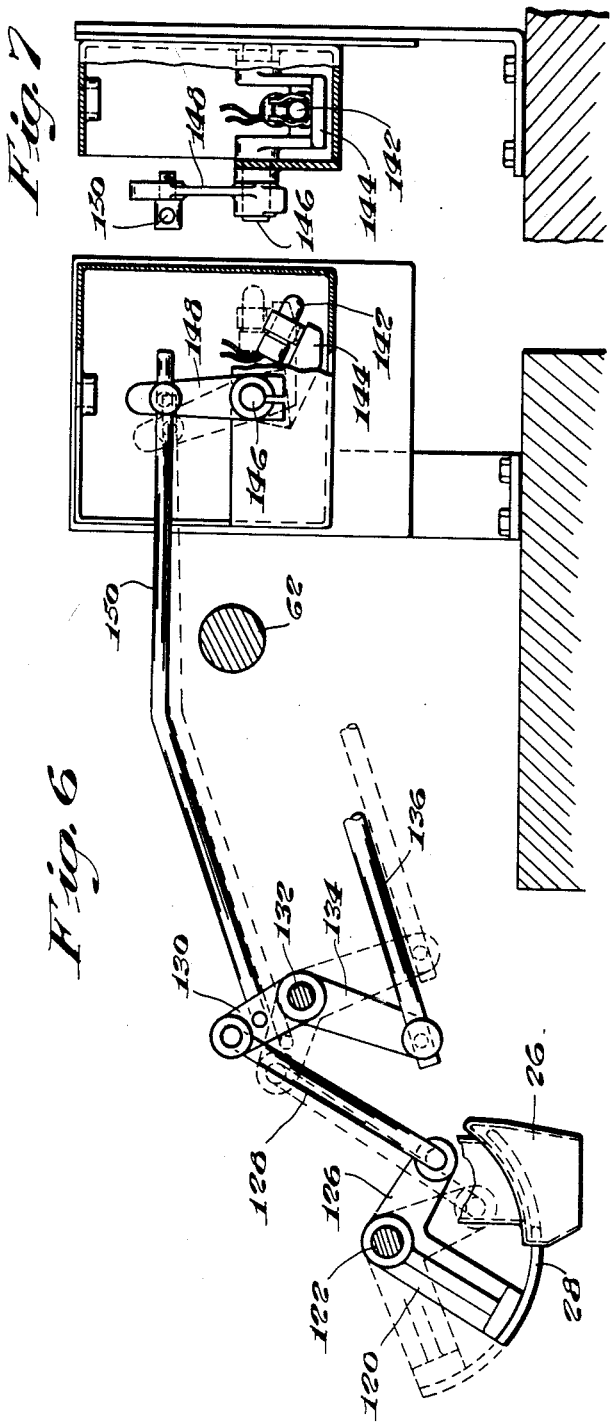

Patented Jan. 5, 1954

2,665,006

UNITED STATES PATENT OFFICE 2,665,006

MATERIAL FEEDING MACHINE

Edward T. Walter, Wollaston, Mass., assignor to Pneumatic Scale Corporation, Limited, Quincy, Mass., a corporation of Massachusetts Application March 30, 1948, Serial No. 18,053

3 Claims. (Cl. 209—244)

This invention relates to a weighing machine.

Difficulty has been experienced in weighing certain types of finely divided materials, such as prepared pie crust mixture, because of the inherent characteristics of such materials which prevent them from flowing freely. All of such materials tend to pack into a mass and many tend to adhere to the surfaces of the conduits through which they must pass in being delivered into the receptacle such as a carton during the weighing operation.

The present invention has for an object to provide a novel construction of packaging machine, and particularly a weighing machine in which such material may be successfully fed and weighed in a weighing machine with commercially acceptable accuracy, notwithstanding the inherent characteristic tendency of the material to pack and to adhere to surfaces over which it is passed.

With this general object in view, and such others as may hereinafter appear, the invention consists in the packaging machine, in the weighing machine, and in the various structures, arrangements and combinations of parts hereinafter described and particularly defined in the claims at the end of this specification.

In the drawings illustrating the preferred embodiment of the invention, Fig. 1 is a side elevation of a weighing machine embodying the present invention; Fig. 2 is a plan view and Fig. 3 is a side elevation of the material feeding mechanism shown in Fig. 1; Figs. 4 and 5 are plan and front elevation views respectively of the vibratory material feeding funnels; and Figs. 6 and 7 are side and end elevations respectively of control mechanism for the vibratory funnels.

In general, the present invention in its preferred form contemplates a novel and improved weighing machine embodying material feeding means of novel construction particularly adapted for feeding materials of a nature which flow with difficulty and which also have an inherent tendency to pack and adhere to the surfaces over which they are guided into the packages to be filled. Illustrative of such a class of materials is a commercially prepared pie crust mixture having as principal ingredients flour and shortening. Such materials cannot be successfully handled in the ordinary constructions of feeding mechanisms heretofore used in weighing machines for freely flowing goods and as a result it has been found difficult to obtain acceptable precision in weighing the same in prior weighing machines.

In accordance with the invention provision is made in the present weighing machine for separating the material into relatively small particles preferably by passing the material through a laterally movable wire mesh or screen, and, the material thus separated may be guided into the package to be filled by a vibratory funnel to produce a substantially uniform stream conducive to accurate weighing operations. Provision may also be made for controlling the operation of the material feeding mechanism in accordance with the operation of the weighing machine so that the feeding mechanism will be operative only during the package filling or weighing period of operation and will be idle during the package moving period of operation of the machine.

Referring now to the drawings, the invention is illustrated as embodied in a two scale weighing machine which, except as hereinafter pointed out may comprise the two scale weighing machine of the type illustrated and described in the United States Patent to S. R. Howard, No. 1,724,591, August 13, 1929. Only sufficient portions of the complete weighing machine have been herein illustrated and will be described as appear to be necessary for a complete understanding of the present invention.

In general, in the operation of such prior two scale weighing machines, a bulk or primary load is introduced into a carton 10 on a scale beam 12 at the first weighing station, and a drip or final load is introduced into the carton on a second scale beam at the second weighing station. Such prior weighing machines are further adapted to operate in successive cycles wherein the weighing operation is performed during one half cycle of operation, and, when the scales have completed their weighing operations, the second half cycle of operation is initiated during which the cartons both unfilled and filled are intermittently advanced one station of operation by conveyer mechanism herein illustrated as including a series of carrier arms 14 attached to an endless chain 16.

Referring now to Figs. 1 and 2, each material feeding unit of the two scale weighing machine is preferably provided with an improved feeding mechanism indicated generally at 20, and which in general comprises a supply hopper 22 and a horizontally movable sifting device, indicated generally at 24, disposed a short distance below the mouth of the hopper and which operates to separate material from the bottom of the hopper and to sift the same into a vibratory guide funnel 26 disposed directly beneath the sifting unit. The vibratory funnel 26 is arranged to guide the material into the carton 10 on the scale beam 12 and the funnel is preferably provided with a shutter 28 at its lower end which is arranged to remain open during the filling operation and to be closed during the package moving period of operation of the machine. It will be understood that suitable provision is also made in such weighing machines for controlling the operation of the machine so that the package moving period of operation cannot start until both scales have completed their independent weighing operations, as fully described in the Howard patent, No. 1,724,591 to which reference is made.

As shown in Fig. 1, the supply hopper 22 preferably comprises a vertically elongated tubular member supported by adjustable brackets 30 extended from a standard 32 attached to the machine frame. The hopper is preferably slightly tapered, as shown, being smaller in diameter at its upper end than at its lower end whereby to reduce to a minimum packing of the material as it progresses through the hopper and to facilitate the movement of the material by gravity through the mouth thereof and into cooperating engagement with the sifting unit 24.

As illustrated in Figs. 2 and 3, the column of material supported in the hopper 22 is normally maintained therein, when the machine is at rest, by a sieve or wire mesh screen 34 disposed relatively close to the bottom or mouth of the hopper, the end of the vertical column resting on the sieve. The mesh of the wire sieve 34 is selected with relation to the consistency and packing characteristics of the material being weighed so that the material will not flow through the sieve unless the latter is moved to sift the material therethrough. As herein shown, the wire mesh screen 34 is generally circular in form and is supported in a laterally movable bracket 36 provided with an upstanding annular rim 38 for confining the material within the sieve. The bracket 36 is supported for movement through a circular path in a horizontal plane, the circular movement or rotation of the bracket being preferably but not necessarily eccentric to the vertical axis of the supply hopper 22, and, as illustrated in Fig. 1, the bracket is arranged to be rotated by a pair of spaced crank arms 40, 42 connected to two radially extended arms 44, 46 of the bracket. The opposite side of the bracket 36 is provided with an extended portion 48 having a friction or bearing plate 50 which is arranged to slide on a cooperating plate 52 secured between the ends of a U-shaped supporting member 54 attached to a bracket 56 mounted on the machine frame.

As herein illustrated, the crank arms 40, 42 are connected to the upper ends of vertical shafts 58, 60 supported in the bracket 56 and are arranged to be rotated through connections from the main driving shaft 62 of the weighing machine including a chain and sprocket drive 64 connected between the main driving shaft and an intermediate shaft 66 supported in a bracket 68 attached to the machine frame. A second chain and sprocket drive 70 is connected between the intermediate shaft 66 and a cross shaft 72 which is provided at both ends with bevel gears 74, 76 arranged to mesh with bevel gears 78, 80 respectively, connected to the lower ends of the vertical shafts 58, 60 upon which the crank arms 40, 42 are mounted. Thus, during the operation of the weighing machine, the sifting unit 24 is moved rapidly through a horizontal circular path, the sieve having an abrading action on the material projecting from the end of the hopper, thus separating the material into relatively small particles and sifting it through the sieve to be guided into a carton to be filled.

In practice, the sifting unit 24 is operated by and in timed relation to the operation of the weighing machine, and, is preferably controlled by the weighing machine to effect feeding of material during the weighing period of operation, and, to discontinue operation of the feeding mechanism during the package moving period of operation, the operation of the machine being controlled by the scale beam, as described in said Howard Patent No. 1,724,591. In the operation of the present machine movement of the sifting unit 24 is effected only during the weighing period of operation through the usual clutch mechanism, not shown, the driven member of which comprises the sprocket 63 of the chain and sprocket drive 64. The sprocket 63 is loosely mounted on the main driving shaft 62 and is arranged to be engaged and disengaged to start and stop the sifting unit through the usual control mechanism and connections shown in the Howard Patent No. 1,724,591. As herein shown, the main driving shaft 62 is arranged to be driven continuously from a driving pulley 82 through a countershaft 84 and bevel gears 86, 88.

It will be observed that in the operation of the machine, the material is fed from the sifting unit 24 into the vibratory funnel 26 during the weighing period of operation of the machine, the shutter 28 being open at this time, as will be described, so that the material is guided directly into the carton 10. As herein shown, see Figs. 4 and 5, the vibratory funnel 26 is supported in tandem with a second vibratory funnel 27 for the other weighing station of the two scale weighing machine, the funnels being secured at opposite ends of an elongated vibratory bar 90 by means of vertical connecting plates 92, each plate being bolted to the bar and to its respective funnel, as shown. The bar 90 is suspended for vibratory movement by two sets of relatively thin plates or vibratory reeds 94, 96 connected at their upper ends to angle pieces 98, 100 which are extended from an elongated supporting bar 102 secured to the machine frame. The vibratory funnels 26, 27 and the supporting reeds 94, 96 are symmetrically disposed or evenly balanced on either side of a central or medial portion of the bar 90, and, as herein shown, the bar is arranged to be vibrated by an electric vibratory motor 104 cooperating with an armature 106 attached to the medial portion of the bar. The vibratory motor 104 is mounted for adjustment relative to the armature 106, being herein shown as connected to a plate 108 by spaced bolts 110 and adjusting nuts 112, the plate 108 being secured to an angle piece 114 attached to the machine frame. The funnels are preferably hinged at a medial portion, as indicated at 116, to permit the upper portion of the funnels to be swung forward for convenience in cleaning or removing obstructions therefrom, and may be detachably connected at their upper ends by bolts 118 to their respective U-shaped supporting members 54.

Provision is made for opening and closing the shutters 28 in timed relation to the operation of the weighing machine to cut off the flow of the material from the funnels 26 at the end of each weighing operation and to permit the material to flow through the funnel during the weighing operation. As herein shown, each shutter 28 comprises a curved plate carried by one arm 120 of a bell crank rockingly mounted on a stud 122 carried by a bracket 124 extended from the machine frame. The second arm 126 of the bell crank is connected by a link 128 to an arm 130 fast on a shaft 132 journalled in the bracket 24, and, a second arm 134 also fast on the shaft 132 is connected by a link 136 to a yoke arm 138 pivotally mounted at 140 and which forms a part of the usual control mechanism for shutter operation in a two scale weighing machine as shown in the Howard Patent No. 1,724,591, to which reference may be had.

In the operation of such shutter mechanism the yoke arm 138 is arranged to be rocked in one direction to open the shutter and in the opposite direction to close the shutter by a suitable cam disc loosely mounted on the main driving shaft 62, the cam disc, not shown, being permitted to rotate in successive half revolutions at the start and end of each weighing period through mechanism controlled by the operation of the scale beam when the scale makes its weight and through suitable resetting mechanism, all as shown and described in the Howard patent above referred to.

Referring now to Figs. 6 and 7, provision is made for controlling the operation of the vibratory motor 104 through connections from the shutter operating linkage whereby to effect closing of an electrical circuit to the vibratory motor when the shutter is opened and to effect opening of the circuit to the vibratory motor when the shutter is closed. As herein shown, the circuit to the vibratory motor 104 includes a mercury switch 142 supported in an arm 144 fast on a rocker stud 146, and is connected to the shutter operating linkage by a second arm 148 also fast on the stud 146, and a link 150 connecting the arm 148 to the arm 130, as clearly shown in Fig. 6. Thus, during the operation of the machine, the circuit to the vibratory motor is opened and closed simultaneously with the opening and closing of the shutter 28 so as to effect vibration of the funnels only during the weighing period of the cycle of operation of the machine.

In the operation of the machine, when a carton comes to rest on the scale beam at the end of the package moving period of operation, the sifting unit 24 is started in operation to feed the material into the funnel 26; the shutter 28 is opened to permit the material to flow into the carton; and vibration of the funnel is initiated. Thereafter, when the carton is filled and the scale overbalances, the sifting unit comes to rest, the shutter is closed, and the vibration of the funnel is stopped. When the stream is cut off by the shutter 28 at the end of the weighing operation, the surplus material is accumulated in the lower end of the funnel to be released into the next carton during the succeeding weighing operation. It will be observed that the lower end of the funnel is provided with vertical side walls to permit the accumulated material to fall freely through the mouth of the funnel when the shutter is opened, the preferred maximum height of the accumulated material being indicated by the dotted line 152 whereby to reduce to a minimum any liability of the accumulated material becoming packed in the funnel and blocking the mouth thereof. The vibratory movement of the funnel is preferably of high frequency to reduce the tendency of the material to adhere to and pile up on the side walls of the funnel.

As above described, the lower end of the supply hopper 22 is preferably disposed relatively close to the sieve 34 so that in operation, the rotary movement of the wire mesh sieve operates to rub against the material emerging from the mouth of the hopper 22, thus producing an abrading action and effecting comminution and dispersion of the material in the sieve until it falls through the openings therein, the described action operating to separate the material into small particles to form a free flowing and substantially uniform stream conducive to an accurate weighing operation. In practice the space or distance between the end of the hopper and the wire mesh sieve may vary with different classes and consistencies of materials, and the wire mesh openings may be varied in size to suit the particular material to be fed. The extent and speed of movement of the sieve may also be varied for most efficient operating results.

From the above description it will be observed that the present weighing machine is particularly adapted for feeding materials which flow with difficulty and which have a tendency to pack together and adhere to the parts of the machine through which they are guided, the present feeding mechanism operating to separate the material into relatively small particles forming a substantially uniform stream to be introduced into the cartons to be filled. It will be understood that the present feeding mechanism may be used with advantage in feeding materials other than those herein particularly specified, and that the present invention may be embodied in other types of package filling or weighing machines for feeding non-free flowing materials.

While the preferred embodiment of the invention has been herein illustrated and described, it will be understood that the invention may be embodied in other forms within the scope of the following claims.

Having thus described the invention, what is claimed is:

1. In combination, material feeding mechanism for feeding packable and non-freely flowing material comprising a supply hopper supporting a vertical column of material from lateral movement, an annular bracket provided with an upstanding rim, a horizontal sieve comprising a substantially planar wire mesh screen secured to the bottom of said annular bracket and disposed a relatively short distance below the mouth of the hopper and against which the lower end of the column rests, the mouth of the hopper being substantially smaller in area than the area of the screen, and means supporting and moving the sieve bodily in an orbital path in the plane of the screen at a uniform distance below the mouth of the hopper and at a uniform rate of movement to impart a constant rubbing action against the lower end of the column to thereby effect separation of the material from the column and the feeding of the same through the sieve to produce a uniform free flowing stream of said packable and non-freely flowing material.

2. Material feeding mechanism as defined in claim 1 wherein said means for supporting and moving said sieve comprises; means defining a fixed surface parallel to said screen slidably supporting a portion of said sieve for horizontal movement in any direction, a pair of spaced cranks of equal length journalled to spaced portions of said sieve and mounted for rotation about parallel axes perpendicular to said screen, and means for simultaneously rotating said cranks at a uniform rate.

3. Material feeding mechanism as defined in claim 1 in combination with a substantially rigid funnel arranged to receive material from said sieve, means supporting said funnel for limited vibratory movement in a direction generally transverse to the direction of flow of material therethrough, and driving means connected to said funnel and arranged to vibrate the same in said transverse direction.

EDWARD T. WALTER.

References Cited in the file of this patent

UNITED STATES PATENTS

| Number | Name | Date |
|---|---|---|
| 117,718 | Arey | Aug. 8, 1871 |
| 287,724 | Root | Oct. 30, 1883 |
| 456,584 | Morse | July 28, 1891 |
| 497,655 | Gray | May 16, 1893 |
| 547,596 | Brantingham | Oct. 8, 1895 |
| 637,388 | Hanak | Nov. 21, 1899 |
| 679,968 | Inman | Aug. 6, 1901 |
| 706,588 | Nickerson | Aug. 12, 1902 |
| 1,660,109 | Ward | Feb. 21, 1928 |
| 1,793,169 | Forster | Feb. 17, 1931 |
| 2,412,425 | Rawson | Dec. 10, 1946 |